US008438383B2

United States Patent
Gamez et al.

(10) Patent No.: US 8,438,383 B2
(45) Date of Patent: May 7, 2013

(54) USER AUTHENTICATION SYSTEM

(75) Inventors: Juan Gamez, Foster City, CA (US); Mark Robinson, San Mateo, CA (US); Sunil Patil, Union City, CA (US)

(73) Assignee: White Sky, Inc., Mountain View, CA (US)

( * ) Notice: Subject to any disclaimer, the term of this patent is extended or adjusted under 35 U.S.C. 154(b) by 659 days.

(21) Appl. No.: 12/754,086

(22) Filed: Apr. 5, 2010

(65) Prior Publication Data

US 2011/0246764 A1 Oct. 6, 2011

(51) Int. Cl.
*H04L 29/06* (2006.01)

(52) U.S. Cl.
USPC .................................................. 713/155; 726/5

(58) Field of Classification Search .................. 713/155, 713/186
See application file for complete search history.

(56) References Cited

U.S. PATENT DOCUMENTS

2007/0186277 A1 8/2007 Loesch et al.
2008/0028444 A1 1/2008 Loesch et al.
2008/0059804 A1 * 3/2008 Shah et al. .................... 713/186

* cited by examiner

*Primary Examiner* — Gilberto Barron, Jr.
*Assistant Examiner* — Devin Almeida
(74) *Attorney, Agent, or Firm* — Main Law Firm; Richard B. Main

(57) ABSTRACT

An ID vault computer control program detects when a user's browser navigates to a third-party website that requires a user ID and password. If it hasn't done so already, it automatically requests a decryption key for a local encrypted vault file from a network server by supplying a personal identification number (PIN) from the user through the input device, a copy of the GUID, and a signature of GUID using a private key for the root certificate. If a decryption key is returned from the network server, the local encrypted vault file is unlocked and automatically supplies a corresponding user ID and password to log-on to the third-party website without the user.

12 Claims, 4 Drawing Sheets

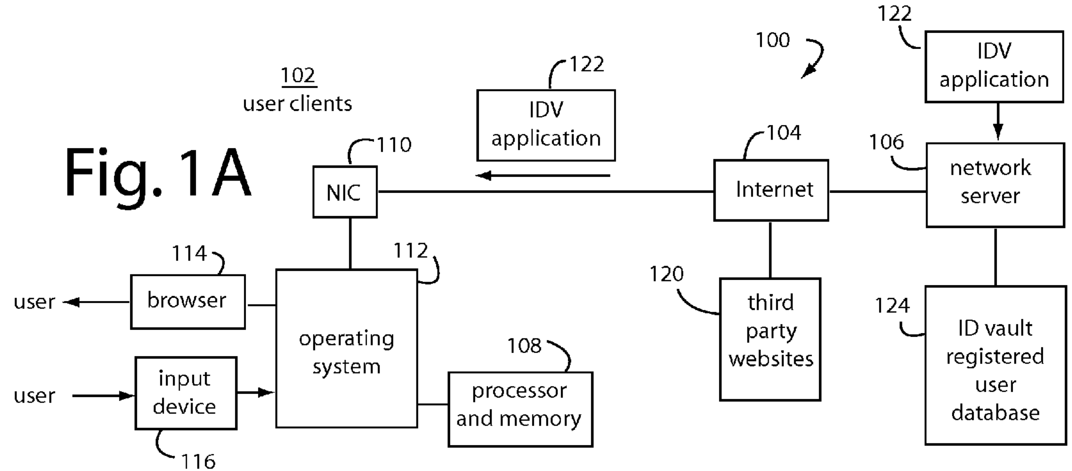
transforms into
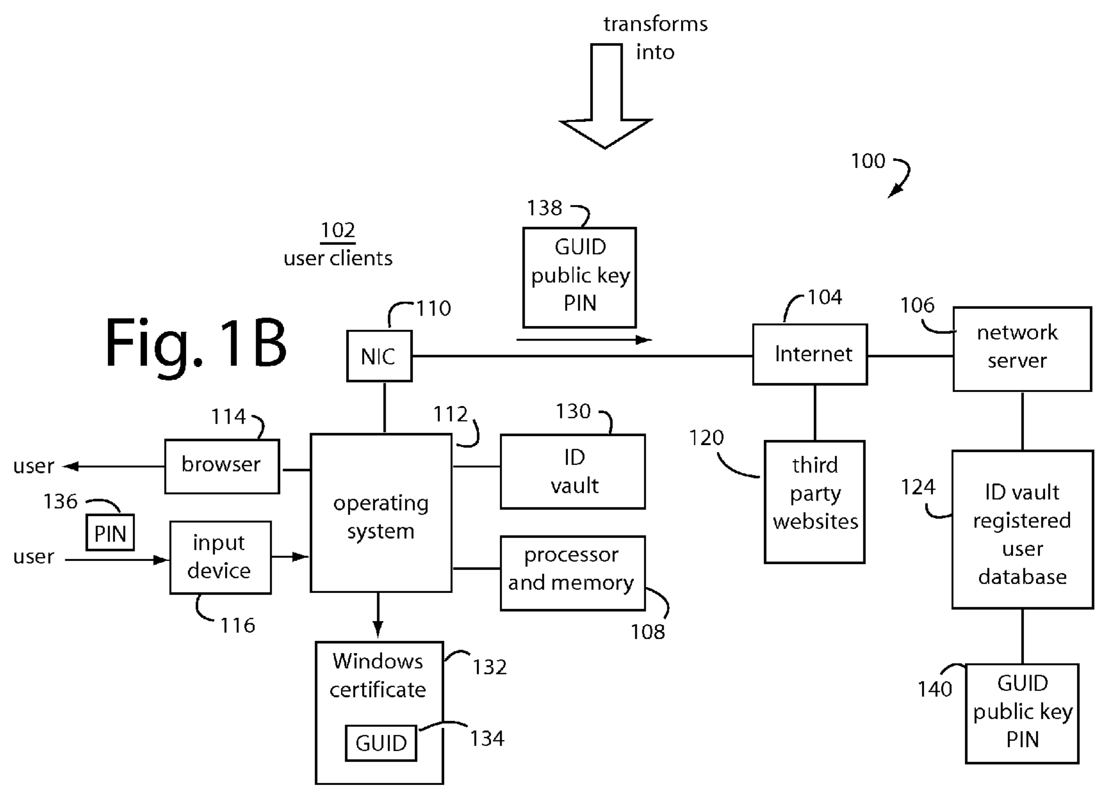

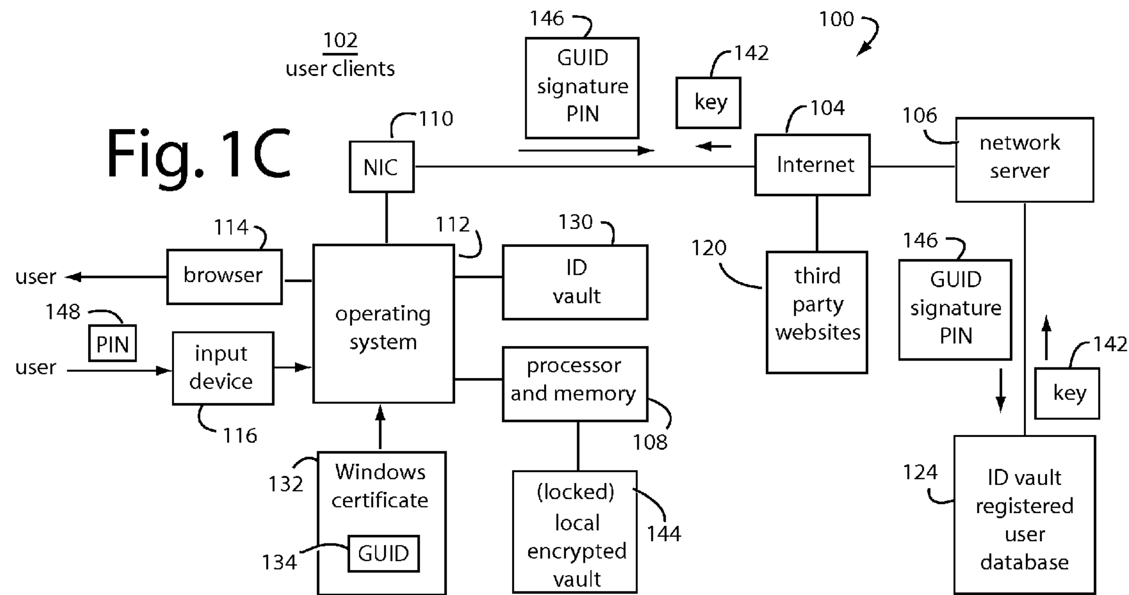
Fig. 1C
102
user clients
146
GUID
signature
PIN
142
key
100
110
NIC
104
Internet
106
network
server
114
browser
112
130
ID
vault
120
third
party
websites
146
GUID
signature
PIN
user
148
PIN
user
input
device
operating
system
processor
and memory
142
key
116
108
132
Windows
certificate
124
ID vault
registered
user
database
(locked)
local
encrypted
vault
144
134
GUID

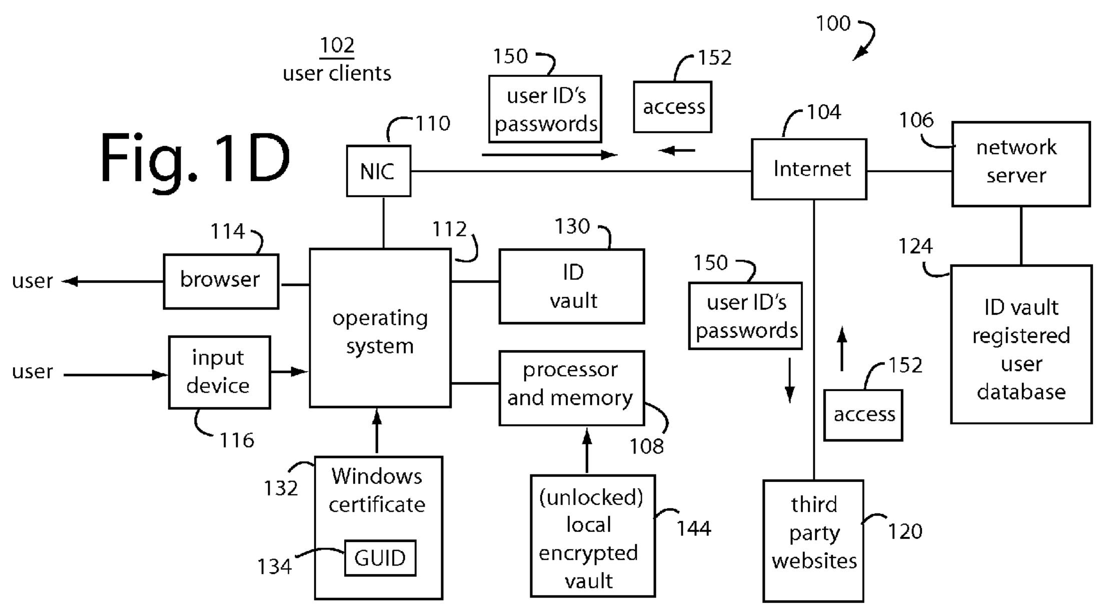
Fig. 1D
102
user clients
150
user ID's
passwords
152
access
100
110
NIC
104
Internet
106
network
server
114
browser
112
130
ID
vault
150
user ID's
passwords
124
ID vault
registered
user
database
user
user
input
device
operating
system
processor
and memory
152
access
116
108
132
Windows
certificate
(unlocked)
local
encrypted
vault
144
third
party
websites
120
134
GUID

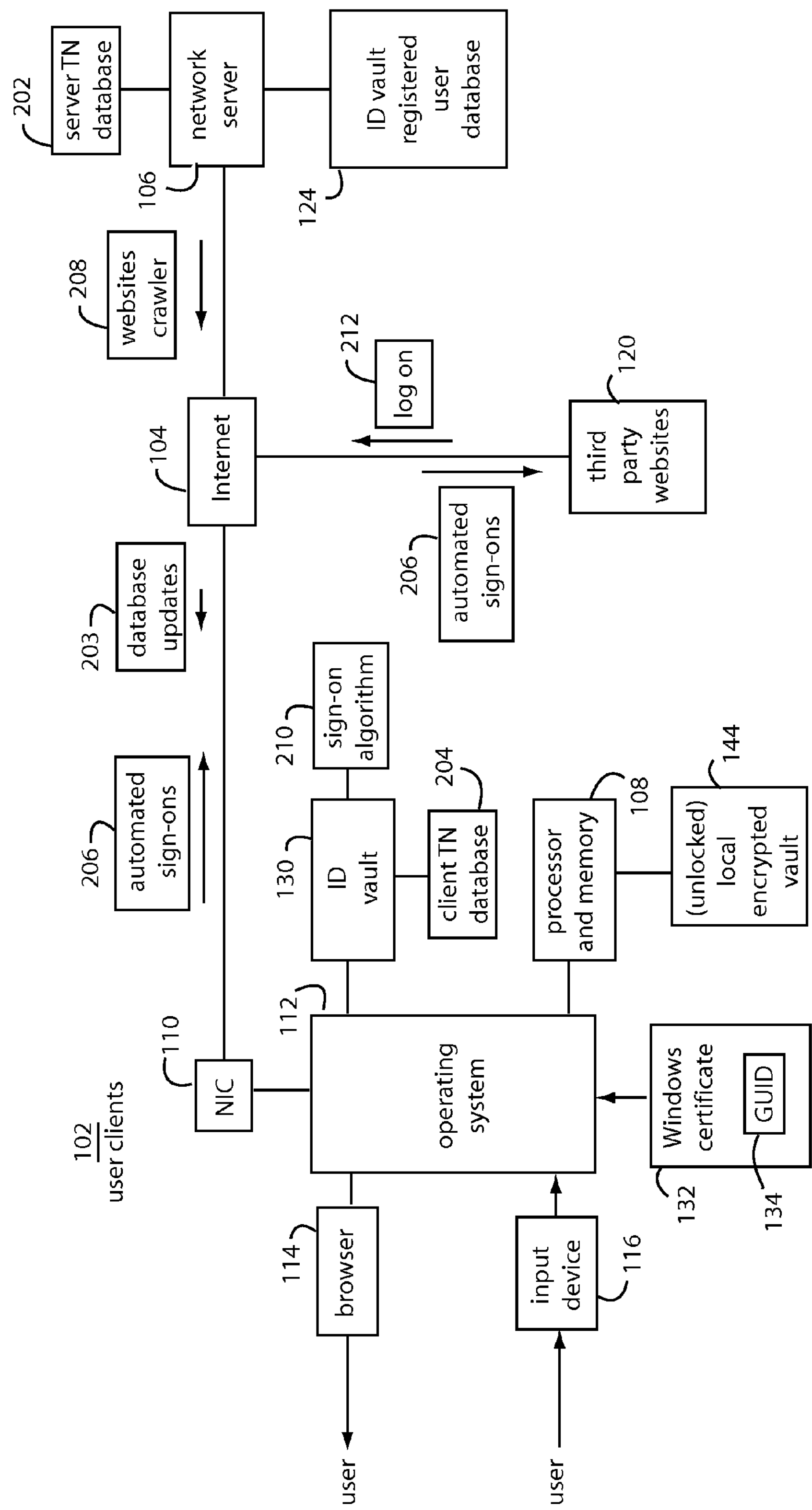
Fig. 2
200
102
user clients
NIC
110
operating system
112
browser
114
input device
116
user
user
Windows certificate
GUID
132
134
ID vault
130
client TN database
204
sign-on algorithm
210
processor and memory
108
(unlocked) local encrypted vault
144
automated sign-ons
206
database updates
203
Internet
104
websites crawler
208
network server
106
server TN database
202
ID vault registered user database
124
log on
212
third party websites
120
automated sign-ons
206

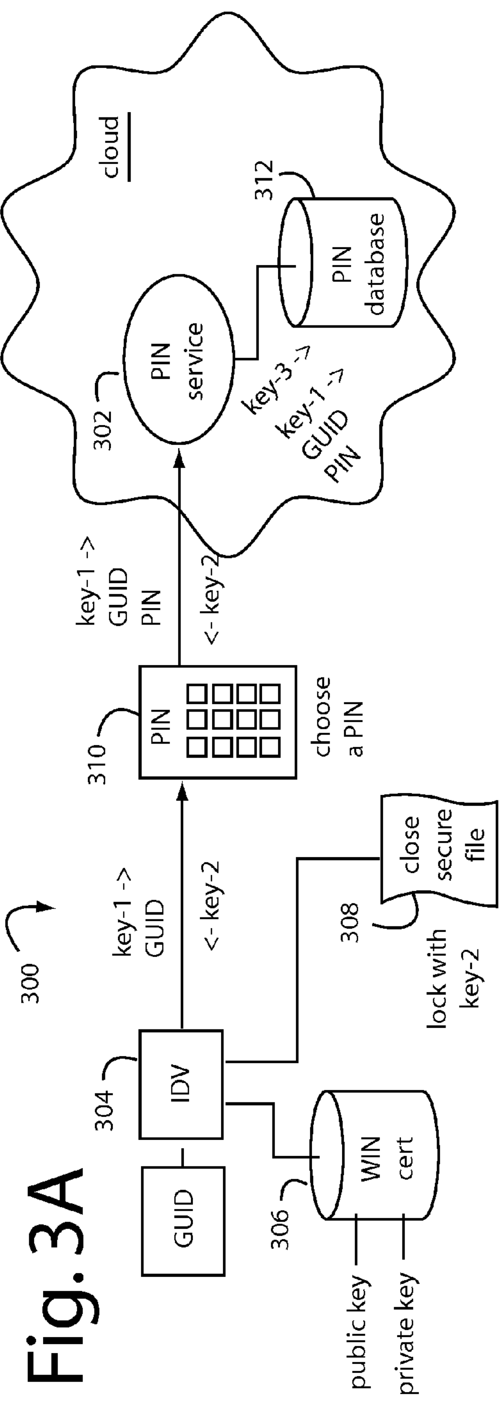
Fig. 3A
300
GUID
IDV
304
WIN cert
306
public key
private key
key-1 -> GUID
<- key-2
close secure file
308
lock with key-2
PIN
310
choose a PIN
key-1 -> GUID PIN
<- key-2
cloud
PIN service
302
key-3 ->
key-1 -> GUID PIN
PIN database
312

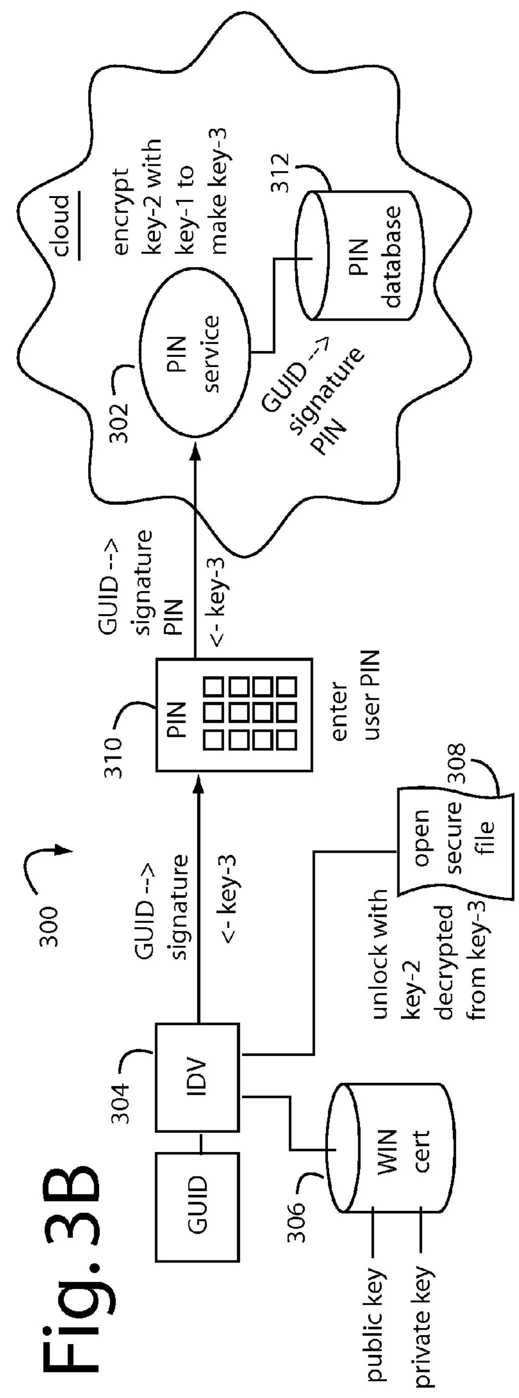
Fig. 3B
300
GUID
IDV
304
WIN cert
306
public key
private key
GUID --> signature
<- key-3
open secure file
308
unlock with key-2 decrypted from key-3
PIN
310
enter user PIN
GUID --> signature PIN
<- key-3
cloud
encrypt key-2 with key-1 to make key-3
PIN service
302
GUID --> signature PIN
PIN database
312

USER AUTHENTICATION SYSTEM

BACKGROUND OF THE INVENTION

1. Field of the Invention

The present invention relates to user authentication systems, and in particular to personal computers and user authentication network servers that work together to machine automate user authentication and log-on to numerous independent and unrelated third-party network websites.

2. Description of the Prior Art

User identification (ID) and passwords have become the standard way the world logs on to secure websites and conducts business. Once the user is authenticated to the satisfaction of the website, the session authorized has a limited time to be completed. After that, the user has to log-on again with at least their password.

Remembering odd user ID's and near cryptic passwords is difficult for everyone. But those, of course are the best ones to have because simple guesses cannot be used successfully by fraudsters. So, the typical Internet and computer users often try to register the same user ID and passwords at most or all of the websites they use. But user ID duplications with other users and ever stricter rules about what constitutes an acceptable password seem to always frustrate those naive attempts to simplify ones life.

A typical user soon has to deal with and remember dozens or more user ID's and the passwords that go with them. Some websites try to bolster the strength of the average user ID and passwords they accept during registration by adding in one more security factor during log-on. For example, a "cookie" can be pushed onto the user computer that helps identify the user as legitimate the next time they log-on. The websites that do this sometimes ask the user if they should "Remember This Computer?".

William Loesch, et al., describe in United States Patent Application US 2008/0028444, published Jan. 31, 2008, a secure website authentication process that allows a user to gather all their user ID's and passwords together and have their computer automatically supply the corresponding user ID and password needed for a website that is browsed by the user. However, this process requires a secure password store or hardware token be presented by the user so that a vault of the collected user ID's and passwords can be accessed. The user authenticates once to their computer, and the computer authenticates to the many secure websites being browsed. The hardware token described can be in the form of a USB-fob.

What is needed is system that allows a user to automatically log-on to all the secure websites they use with strong authentication mechanisms, and yet be as simple as having to remember and enter only one universal password. What is also needed in order for such a system to be a commercial success is that users should not be required to install any new hardware on their personal computer, nor should anything different be required of the third party websites being visited.

SUMMARY OF THE INVENTION

Briefly, a user authentication system embodiment of the present invention includes a network server able to authenticate its user clients on the receipt of a user ID and password over the Internet. Special computer programs downloaded to executable memory on the user client's computer authenticates the user locally by requiring a personal identification number (PIN). That PIN and a GUID signed with the user certificate's private key stored in the windows certificate store are sent to the network server. There, the server verifies the signature using the certificate's public key and tests for the correct PIN as per the user registration database. If correct, a perishable session key is returned to the user client's computer that will temporarily allow it to unlock a local secure, encrypted file holding all the various user ID's and corresponding passwords for the websites the user has registered with before. The network server also supplies templates and patterns that allow the browser on the user client's computer to recognize the opportunities to enter specific user ID and password, and how to structure that response.

These and other objects and advantages of the present invention will no doubt become obvious to those of ordinary skill in the art after having read the following detailed description of the preferred embodiments which are illustrated in the various drawing figures.

IN THE DRAWINGS

FIGS. 1A-1D are functional block diagrams of a user authentication system embodiment of the present invention with a network server and a client for user authentication;

FIG. 2 is a functional block diagram of a trusted network library system embodiment of the present invention that is added to support the user authentication system of FIGS. 1A-1D; and FIGS. 3A and 3B are functional block diagrams of a user authentication method embodiment of the present invention useful in the user authentication system of FIGS. 1A-1D. FIG. 3A represents the functioning of the method when a user registers the ID vault application program for the first time. FIG. 3B represents the functioning of the method when a user wants to be authenticated to the server.

DETAILED DESCRIPTION OF THE PREFERRED EMBODIMENT

FIGS. 1A-1B represent a user authentication system embodiment of the present invention, and is referred to herein by the general reference numeral 100. FIG. 1A represents an initial condition in which one of many user clients 102 has connected through the Internet 104 to a network server 106. The user clients 102 typically include a processor and memory 108, network interface controller (NIC) 110, an operating system 112 like WINDOWS, a browser 114 like INTERNET EXPLORER, and an input device 116 like a common keyboard and mouse. The browser 114 also allows the user clients 102 to visit third-party secure websites 120 that each require authentication from the user, e.g., a user ID and password.

Network server 106 can offer for download an ID vault (IDV) application program 122, and maintains a database 124 of registered IDV users. The IDV application program 122 can be sold, subscribed to, given away for free, offered as a prize or award, and/or provided on a disk or memory card.

FIG. 1B represents how the user authentication system 100 is transformed by the installation of IDV application program 122 in user clients 102. An installation and registration process, when launched, builds an ID vault run-time client 130, a WINDOWS root certificate 132, and a globally unique identifier (GUID) 134. The WINDOWS root certificate 132 is created and signed for exclusive use by ID vault run-time client 130. There is no other root authority involved. The GUID 134 is a unique identifier earmarked exclusively for the particular installation of ID vault run-time client 130 on user client 102. When GUID 134 is created it is placed in WINDOWS root certificate 132. Network server 106 is called to create a PIN record and passes the GUID 134, the public key for WINDOWS root certificate 132, and a personal identification number (PIN) 136 provided by the user. These are forwarded in a message 138 to network server 106. The network server 106 creates a new user record 140 and stores it and others in user database 124. The particular user and their user client 102 are thereby registered.

FIG. 1C represents how the user authentication system 100 is transformed from that shown in FIG. 1B by the running of ID vault run-time client 130 in user client 102. When the user tries to open an account at a third-party website 120, a service in ID vault run-time client 130 is called to get a "protected" encryption key 142 needed to access a locked, local encrypted vault 144. That call passes a message 146 that includes a copy of GUID 134, a signature of GUID 134 using the private key for WINDOWS root certificate 132, and a freshly acquired PIN 148 (which is required to match the original PIN 136 used during registration for the user to be authenticated). Network server 106 then verifies that GUID 134 already exists in database 124, and if so, tests to see that the signature is correct using the public key previously supplied in new user record 140. It further tests to see that PIN 148 matches PIN 136 which was received previously in new user record 140. If the tests are successful, a "protected" encryption key 142 is sent to user client 102. Such "protected" encryption key 142 will expire after a limited time. But before it does expire, the user can automatically and transparently log-on to many secure third party websites 120 that its registered for.

The "protected" encryption key 142 the server returns is not the actual decryption key needed to unlock the secure files. The receiving client uses its certificate (private key) to actually decrypt key 142 and get the actual symmetric key that was used to encrypt the vault. In other words, the "protected" encryption key the server sends needs further processing by the client and its certificate before the response can be used to access the vault. The certificate and the key returned by the server are therefore strongly bound.

FIG. 1D represents how the user authentication system 100 is transformed from that shown in FIG. 1C by the routine use of ID vault run-time client 130 in user client 102. After the "protected" encryption key 142 is received, the local encrypted vault 144 can be unlocked. Thereafter, as browser 114 navigates to third party websites 120, ID vault run-time client 130 recognizes that a user ID and password 150 are needed. The local encrypted vault 144 stores all the user ID's and passwords 150 that were collected in previous sessions to automatically log-on to corresponding third party websites 120. Once logged on, the user client is given an access response 152. If a token is needed from a fob, the token is read and entered by the user as usual at input device 116. ID vault run-time client 130 will automatically relock local encrypted vault 144 after a predetermined or programmable time set by the user.

GUID 134 is a randomly generated 128-bit integer represented by a 32-character hexadecimal character string. For example, "c12eb070-2be2-11df-8a39-0800200c9a66". The odds are that such number will be unique for all practical purposes. A GUID can be assumed to never be generated twice by any computer. Microsoft Windows uses GUID's internally to identify classes in DLL files. A script can activate a specific class or object without having to know the name or location of the Dynamic Linked Library that includes it. ActiveX uses GUID's to uniquely identify controls being downloading and installed in a web browser. GUID's can be obtained with a random-number generator, or based on a time. GUID's can also include some parts based on the hardware environment, such as the MAC address of a network card.

Certificates, like WINDOWS root certificate 132, support authentication and encrypted exchange of information on open networks such as the Internet, extranets, and intranets. The public key infrastructure (PKI) is used to issue and manage the certificates. Each WINDOWS root certificate 132 is a digitally-signed statement that binds the value of a public key to the identity of the person, device, or service that holds the corresponding private key. With conventional certificates, host computers on the Internet can create trust in the certification authority (CA) that certifies individuals and resources that hold the private keys. Trust in the PKI here is based on WINDOWS root certificate 132. Such certificates are conventionally used in secure sockets layer (SSL) sessions, when installing software, and when receiving encrypted or digitally signed e-mail messages.

The Update Root Certificates feature in Windows Vista is designed to automatically check the list of trusted authorities on the Windows Update Web site when this check is needed by a user's application. Ordinarily, if an application is presented with a certificate issued by a certification authority in a PKI that is not directly trusted, the Update Root Certificates feature will contact the Windows Update Web site to see if Microsoft has added the certificate of the root CA to its list of trusted root certificates. If the CA has been added to the Microsoft list of trusted authorities, its certificate will automatically be added to the set of trusted root certificates on the user's computer.

When a certification authority is configured inside an organization, the certificates issued can specify the location for retrieval of more validation evidence. Such location can be a Web server or a directory within the organization.

FIG. 2 represents a trusted network library system 200 in an embodiment of the present invention that can be included with the user authentication system 100 of FIGS. 1A-1D. The items in FIG. 2 that are the same as those in FIGS. 1A-1D use the same numbering. Elements of trusted network library system 200 would normally be installed as part of the installation process for ID vault run-time client 130.

The trusted network library system 200 builds a server TN database 202 of trusted third-party websites 120, and is periodically copied in an update 203 to user clients 102 as a client TN database 204. And to control spoofing, client TN database 204 itself is preferably read-only, encrypted, and secure after being installed.

Each entry in server TN database 202 includes a list of websites that are trusted, a description of corresponding sign-on elements and protocols 206 for each website, and any sign-on flags. It could also include websites to avoid. About 8,000 trusted websites would be typical, and these span the range of secure websites that a majority of Internet users would register with and do business.

The Internet 104 and the third-party websites 120 are very fluid and ever changing in the number and qualities of the websites, and so keeping server TN database 202 fresh and up-to-date is an on-going challenge. The construction and testing of server TN database 202 can be automated for the most part, e.g., with a web-site crawler 208. But a professional staff can be needed to guide and support the results obtained so questions can be resolved as to which third-party websites 120 to trust, which are abusive, what protocols to use, and for each, what are the proper mix of sign-on elements. These are collectively embodied in a logical step-by-step procedure executed as a program by processor and memory 108, referred to herein as a sign-on algorithm 210. Each successful use of sign-on algorithm 210 will result in a third-party log-on 212 for the corresponding user client 102.

Keeping the client TN database 204 as up-to-date as possible allows user clients 102 to successfully log-on quickly, it also prevents screen scraping by hiding the sign-on session, and further frustrates attempts at key logging and pharming. Having to download server TN database 202 in real-time every time it is needed is not very practical or desirable. And the connection to network 106 can be dropped or lost without causing interruptions, as long as the local encrypted vault 144 remains unlocked.

The client TN database 204 is preloaded with bundles of data that include, for each of thousands of third-party websites 120, a description of its sign-on elements, IP-data, and sign-on flags. Such data helps the ID vault 130 recognize when the user has navigated to a secure website with the browser 114. The description of sign-on elements describes user name, password, submit buttons, protocols, page fields, etc. The IP-data includes anti-phishing and anti-pharming information. The sign-on flags are used to turn on and turn off special scripts and algorithms 210.

In an alternative embodiment, the whole contents of server TN database 202 are not preloaded into client TN database 204. Only the specific bundle for a particular third party website 120 is downloaded the first time the user navigates browser 114 to the log-on page. Thereafter, the client TN database 204 retains it for repeated visits later. Only if the retained copy fails to work will another download be attempted to fetch an update that may have occurred in server TN database 202.

FIGS. 3A and 3B represents a method embodiment of the present invention for user authentication, and is referred to herein by the general reference numeral 300. Method 300 is implemented with computer software that executes on the personal computers and mobile wireless devices of users and at least one network server 302 that includes a PIN service. An ID vault application program 304 is loaded on the user's personal computer or mobile wireless device. It uses public key infrastructure (PKI) encryption to create a single, unique, non-exportable certificate 306 when ID vault application program 304 is installed. A secure file 308 is encrypted with symmetric encryption with a secret key provided by the server 302. The server encrypts the secret key using the public key provided by ID vault application program 304. Then ID vault application program 304 can decrypt it using its private key. The network server 302 will provide those keys only after the user supplies a fresh PIN pad dialog 310 and a check is made to see that non-exportable certificate 306 is correct for this user. Both PIN pad dialog 310 and non-exportable certificate 306 are gathered into a PIN database 312 during an initial registration process for ID vault application program 304. As such, non-exportable certificate 306 (something you have) serves as one of two authentication factors. PIN pad dialog 310 (something you know) serves as the mechanism to input the second authentication factor.

The non-exportable certificate 306 creates a pair of asymmetric encryption keys, one private and one public according to Public Key infrastructure (PKI). In cryptography, a PKI is an arrangement that binds public keys with respective user identities by means of a certificate authority (CA). The user identity is unique within each CA domain. The binding is done during a registration and issuance process. A Registration Authority (RA) assures the binding. The user identity, the public key, their bindings, validity conditions, etc. cannot be faked in public key certificates issued by the CA.

When a user registers ID vault application program 304 for the first time, as in FIG. 3A, each client sends their certificate's public key (key-1), a self-generated GUID, and a PIN they've chosen. The server 302 generates a symmetric key (key-2), and then encrypts key-2 with the supplied key-1, producing a key-3. Key-2 is the actual key for encrypting/decrypting the vault, secure file 308. All the information passed including key-3 are stored in the PIN store database 312. For access to key-2, the certificate's private key is needed to decrypt key-3.

Thereafter, when client 304 has to authenticate a user, as in FIG. 3B, it sends the GUID, a signature of the GUID using the certificate's private key, and a freshly acquired PIN entered at PIN pad 310. Server 302 makes various the tests described above, and sends back key-3. Key-3 is received by the client 304, decrypted to get key-2, and at that point the vault secure file 308 can be accessed using key-2. Only a machine holding the correct certificate can decrypt key-3 because the key-3 was created by using the certificate's public key.

ID vault application program 304 passes its public key for non-exportable certificate 306 to network server 302, e.g., a key-1. The network server 302 uses a symmetric encryption process with a "secret key", key-2, to encrypt key-1. This produces a key-3 that is stored in PIN database 312. The PIN database 312 is secure from attack because the attackers would need to have access to PIN database 312 and key-1, for every user. Key-2 is returned to ID vault application program 304 so that it can create or unlock encrypted file 308. The key-2 held by ID vault application program 304 is destroyed after it has served its purpose. A new key-2 will therefore be requested to be supplied from network server 302 the next time encrypted file 308 needs to be unlocked. That request will require a fresh entry of PIN pad dialog 310 and an asymmetrically encrypted signature from non-exportable certificate 306. Such signature can include a GUID. The number of failed attempts to authenticate the user and their computer to the server are limited.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the scope of the invention.

What is claimed is:

1. An improved user authentication system, comprising:

a user client computer including a network interface, an operating system, a processor and memory, a browser, and an input device;

the improvement comprising:

a root certificate attached to the operating system;

a globally unique identifier (GUID) disposed within the root certificate;

a local encrypted vault file for storing user ID's and passwords corresponding to third-party websites, and that is normally locked; and an ID vault computer control program attached to the operating system and for execution by the processor and memory;

wherein, the ID vault computer control program detects when the browser navigates to a third-party website that requires a user ID and password, and automatically requests a decryption key for the local encrypted vault file from a network server by supplying a personal identification number (PIN) from the user through the input device, a copy of the GUID, and a signature of GUID using a private key for the root certificate; and wherein, if said decryption key is returned from said network server, the local encrypted vault file is unlocked and automatically supplies a corresponding user ID and password to log-on to the third-party website without the user.

2. The improved user authentication system of claim 1, further comprising:

a client-copy of a trusted network (TN) database that includes sign-on protocols and scripts for answering a third party website's invitation to log-on with a corresponding user ID and password of a previously registered user.

3. The improved user authentication system of claim 1, further comprising:

a server-copy of a trusted network (TN) database that includes protocols and scripts necessary for logging on to third party websites; and a communications mechanism for periodically downloading a copy of said trusted network (TN) database to a client.

4. The improved user authentication system of claim 1, further comprising:

a sign-on algorithm comprising a step-by-step procedure for recognizing an invitation by a third-party website to log-on, and to supply a corresponding user ID and password to that third-party website from the local encrypted vault file.

5. A method for strong authentication of a user, comprising:

accepting a personal identification number (PIN) into a client computer that will thereafter be used as a first authentication factor to a network server;

generating a globally unique identifier (GUID) only once with said client computer, and digitally encrypting it with an asymmetric encryption algorithm that uses a public key and a private key, wherein the encrypted GUID is digitally stored in said client computer and is thereafter used as a second authentication factor to said network server;

authenticating a user to said network server by forwarding a PIN input collected and said encrypted GUID and said public key to said network client;

returning a secret key from said network server to said client computer if said PIN input collected and encrypted GUID pass a test; and unlocking a local, symmetrically encrypted file with said secret key, wherein the contents are then accessible for use by said client computer.

6. The method of claim 5, further comprising:

storing user ID and password information for third-party websites in said symmetrically encrypted file.

7. The method of claim 5, further comprising:

registering said user together with said client computer with said network server and storing a PIN input collected, said public key, and said encrypted GUID in a PIN database for user authentication tests later.

8. An improved user authentication system, comprising:

a user client computer including a network interface, an operating system, a processor and memory, a browser, an input device for a user to enter a PIN, and a local, secure encrypted file with protected data;

a globally unique identifier (GUID) and a root certificate disposed in the user client computer;

a public key infrastructure (PKI) encryption and decryption process disposed in the user client computer, and that includes a private key and a public key (key-1) bound to the GUID and a root certificate;

a symmetric encryption and decryption process that uses a secret key for encryption and decryption;

a network server including a PIN verification process and a user registration database;

the improvement comprising:

a user registration process that self-generates the GUID, that uses the PKI encryption process to encode the GUID and root certificate, that sends to the network server the root certificate's public key (key-1), the self-generated GUID, and a PIN chosen by the user and entered at the input device, that causes the network server to generates a symmetric key (key-2), and then encrypts key-2 with the supplied key-1, producing a key-3, and that causes the network server to store key-3 and all the information passed from the client computer in the registration database, wherein access to key-2 requires the certificate's private key to decrypt the key-3 stored in the registration database; and a user authentication process that sends the GUID, a signature of the GUID using the root certificate's private key, and a freshly acquired PIN entered, wherein the network server makes tests described above, and sends back key-3 to the user client computer which decrypts it to recover key-2, and then accesses the protected data in the vault secure file using key-2;

wherein, only a machine holding the correct root certificate can decrypt key-3 because key-3 was created by using the root certificate's public key.

9. The improved user authentication system of claim 8, further comprising:

a client-copy of a trusted network (TN) database that includes sign-on protocols and scripts for answering a third party website's invitation to log-on with a corresponding user ID and password of a previously registered user.

10. The improved user authentication system of claim 8, further comprising:

a server-copy of a trusted network (TN) database that includes protocols and scripts necessary for logging on to third party websites; and a communications mechanism for periodically downloading a copy of said trusted network (TN) database to a client.

11. The improved user authentication system of claim 8, further comprising:

a sign-on algorithm comprising a step-by-step procedure for recognizing an invitation by a third-party website to log-on, and to supply a corresponding user ID and password to that third-party website from the local encrypted vault file.

12. The improved user authentication system of claim 8, wherein the user authentication process is configured to sign a PIN and a GUID with a user certificate's private key stored in the windows certificate store, and sent to the network server, and wherein the server verifies the signature using the certificate's public key and tests for the correct PIN as verifiable by the registration database.

* * * * *